Nov. 29, 1927. Re. 16,800

J. POLACHEK ET AL

WINDOW

Original Filed May 2, 1923 2 Sheets-Sheet 1

WITNESSES

Frank J. Fagiani

E. L. Mueller

INVENTOR

J. POLACHEK

J. JEPSEN

BY E. PEREMY

Munn & Co.

ATTORNEYS

Nov. 29, 1927. Re. 16,800

J. POLACHEK ET AL

WINDOW

Original Filed May 2, 1923 2 Sheets-Sheet 2

WITNESSES

Frank J. Faggiani

E. L. Mueller

INVENTOR

J. POLACHEK

J. JERSEN

BY E. PEREMI

Munn & Co

ATTORNEYS

Reissued Nov. 29, 1927. Re. 16,800

UNITED STATES PATENT OFFICE.

JOHN POLACHEK, OF NEW YORK, JULIUS JEPSEN, OF BROOKLYN, AND EDMUND PEREMI, OF NEW YORK, N. Y., ASSIGNORS TO JOHN POLACHEK, DOING BUSINESS AS JOHN POLACHEK BRONZE & IRON CO., OF LONG ISLAND CITY, NEW YORK.

WINDOW.

Original No. 1,519,087, dated December 9, 1924, Serial No. 636,156, filed May 2, 1923. Application for reissue filed March 9, 1925. Serial No. 14,992.

This invention relates to improvements in windows and has particular reference to a metallic window construction.

The object of the invention is to provide an improved metallic window with sliding sashes wherein the window frame and sashes are so constructed and interengaged that when the window is in closed position, there will be insured two or more points of contact, metal to metal, all around each sash, that is, at the head, the sill and the two sides of the frame and at the meeting rail or rails of the sashes.

Another object of the invention is to provide an improved window wherein the window frame and sashes are so constructed and interengaged that the same will effectively prevent the ingress of air and dust into a room when the sashes are in closing position.

A further object is the provision of an improved window in which the frame and sashes are so constructed and interengaged that any rattling of the sashes, when closed, due to lateral movement thereof with respect to the frame, will be prevented.

A still further object is to so construct the frames and sashes that the window may be readily and quickly assembled in operative position.

The above and other objects will appear more clearly from the following detail description, when taken in connection with the accompanying drawings, which illustrate one embodiment of the inventive idea.

In the drawings—

Figure 1:
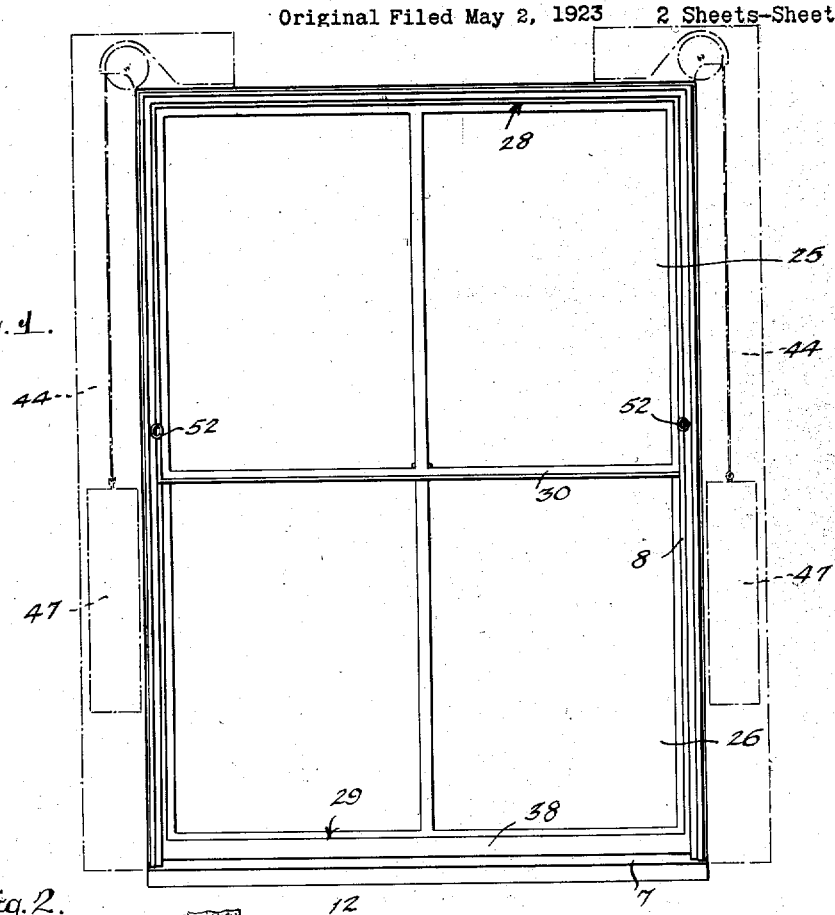
Figure 1 is a front elevation of a window constructed in accordance with the invention.
Figure 2:
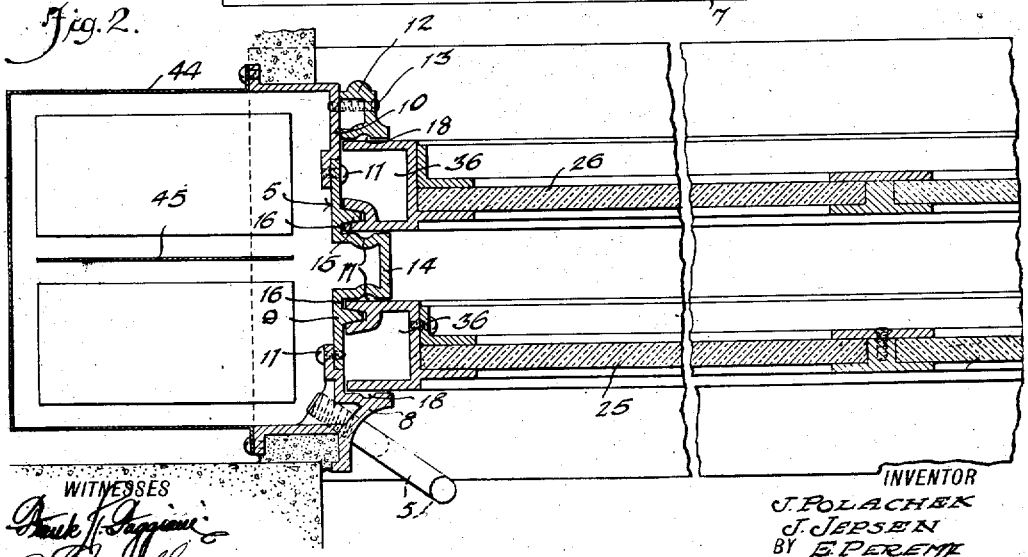
Figure 2 is a fragmentary transverse section of the window showing both sashes in cross section.

The window is made of any desired material, such as steel or bronze, which is rolled or extruded to form the various parts of the window. The frame of the window comprises the side, top and sill sections 5, 6 and 7, respectively. Inasmuch as the side and top sections are identical in construction, a description of one will suffice for both and similar characters will be used to designate like parts. The side sections, only one of which is illustrated in Figure 2, each comprises the outer, intermediate and inner portions 8, 9 and 10, respectively, the intermediate portion being secured along its longitudinal edges with the adjacent overlapping longitudinal edges of the outer and inner sections by means of suitable fasteners 11. Forming a part of the inner portion 10 is a stile 12 secured to said portion by means of fasteners 13. Medially of its longitudinal edges the intermediate portion 9 is projected or formed to provide a parting strip 14 and on opposite sides of said parting strip the portion 9 is further provided with wedge-shaped flanges 15 which combine with the sides of the parting strip to form grooves 16 for a purpose which will presently appear. The sides of the parting strip 14 are also formed with vertically disposed grooves 17 similar to grooves 18 formed in opposed surfaces of the portion 8 and the stile 12.

The sill section 7 is of channeled formation so as to receive a suitable material 19 utilized to securely anchor said section in proper position with respect to the sill of the window opening. Intermediate the edges of the section 7 the same is provided with an upwardly projecting portion 20 having the sides 21 and 22, the former of which cooperates with a wedge-shaped flange 23 to form a groove 24 for a purpose which will appear in the course of the description.

Figure 3:
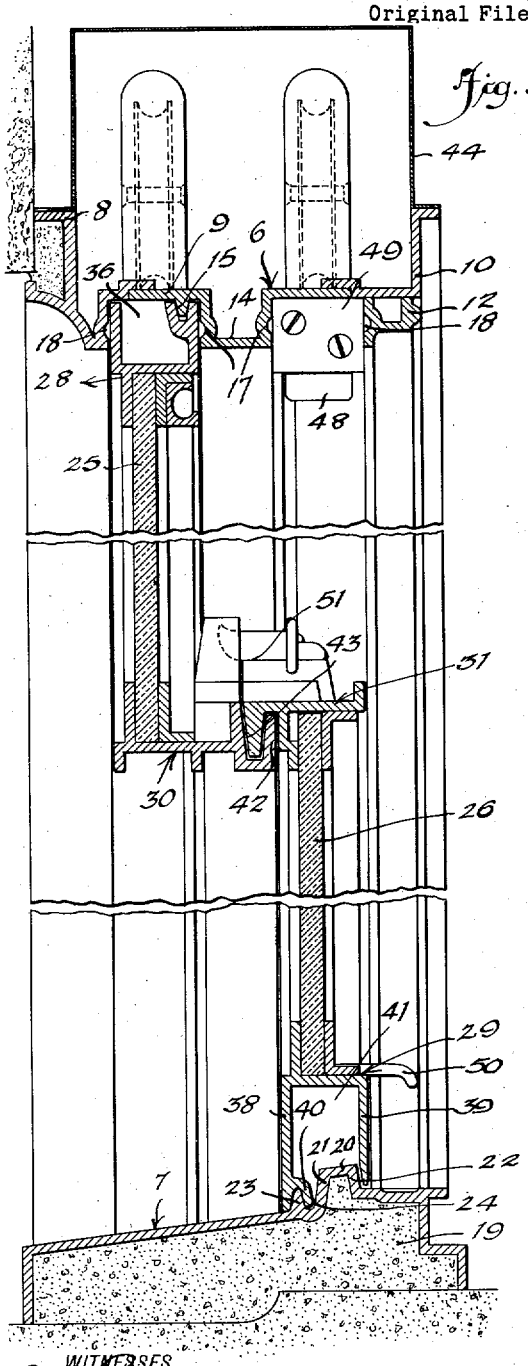
Figure 3 is a vertical sectional view of the window with both sashes in closing position.
Figure 4:
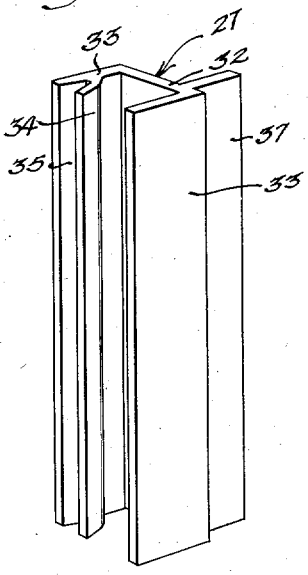
Figure 4 is a perspective view of one of the stiles of the sashes.

The window further comprises the upper and lower sashes 25 and 26 which are practically identical in construction. The sashes 25 and 26 include stiles, generally indicated by the numeral 27, the upper and lower rails 28 and 29 and the meeting rails 30 and 31. The stiles 27 and the upper and lower rails 28 and 29 are substantially alike in construction and each includes a web portion 32 (see Figure 4) having the flanges 33 extending from the longitudinal edges thereof in the same direction and in parallel relation. Formed integrally with one of the flanges 33 and extending from the inner face thereof and intermediate its longitudinal edges is a diagonally disposed flange 34 which combines with the outer portion of said flange 33 to form a substantially V-shaped groove 35. The grooves 35 of the various stiles 27 and upper rail 28 are designed to receive the flanges 15 of the intermediate portions of the side and top sections of the frame, the outer portions of the flanges 33 upon which the flanges 34 are formed then engaging in the grooves 16, thus forming a connection between the sashes and frame, which will prevent lateral movement and consequent rattling of the sashes. In this manner, a three point contact is provided. This contact is continuous for the full length of the flange 15. It will, therefore, be noted that a plurality of surface contacts are provided which will be in engagement for their full surface when the window is completely closed as shown in Figures 2 and 3. It will be noted that the V-shaped groove 35 and flange 15 are accurately matched to fit each other and the parts are so positioned that ordinarily the sash may be moved up and down freely but when the parts are in their completely or exactly closed position, there will be a good contact between the various parts.

The flanges 38 and 39 of the lower rail 29 of the lower sash are of different widths and the flange 38 is provided with a flange 40 similar to the flanges 34 to form a groove for receiving the flange 23 when the lower sash is in closing position. The flange 40 then also engages in the groove 24 to form a joint between the lower rail and sill similar to that described in connection with the stiles 27 and upper rail 28. The wedge-shaped flanges 23 and the V-shaped groove formed by flanges 38 and 40 are accurately matched so that when the lower sash is completely closed, the parts will assume the position shown in Figure 3 and thereby produce a three point contact or three surfaces of contact for the full length of the sill.

The meeting rails 30 and 31 are provided with a well known locking device 51 of a type which when thrown to locking position simultaneously, forces the upper sash upwardly a short distance while it draws the meeting rails 30 and 31 together to effect continuous contact of certain contact surfaces as illustrated in Figure 3. It will be noted that the adjacent edges of the meeting rails are provided with flanges 42 and 43 which overlap and interengage as illustrated in Figure 3. The window is illustrated in Figure 3 in the position when the lock 51 has been operated and the window completely or tightly closed. When this takes place, the two meeting rails are pulled toward each other to produce a good contact over a plurality of surfaces not only with the flanges 15 but also with the parts of the meeting rails.

From Figure 3 it will be noted that surface 43′ is tightly pressing against the surface 43″ while the surface 42′ is pressing tightly against the surface 42″ and there is a small space 30′ between the flanges 42 and 43. Thus with the upper rail 28 and the rail 30 of the upper sash 25 simultaneously forced inward in a lateral direction with respect to the frame, and at the same time the meeting rail 31 and the lower rail 29 of the lower sash simultaneously forced outward in a lateral direction with respect to the frame, all as hereinbefore explained, the inner flanges 33 of the stiles 27 of the upper sash 25 are also simultaneously forced into face contact with the inner side of the parting strips 14, also effecting other contacts between the flanges 15 of the side jambs of the frame and the flanges 34 of the sash stile. The outer flanges 33 of the two stiles 27 of the lower sash are also forced into face contact with the inner side of the parting strip 14 as well as effecting other parts between the flanges 15 of the side jambs of the frame and the flanges 34 of the sash stiles. It, therefore, is evident that the complete closing and locking of the sashes effects two or more continuous contacts, metal to metal, between the two sashes and the frame at the head, the two sides and the sill as well as the meeting rails of the two sashes.

The outer surfaces of the inner flanges 33 of the stiles 27 and upper rail 28 engage the sides of the parting strip 14 and combine with the grooves 17 therein to form small air chambers which aid in preventing air passing around the sashes into the interior of a room. In addition to the air chambers formed by the grooves 17 the outer flanges 33 of the stiles 37 and upper rail 28 combine with the grooves 18 in the members 8 and 12 to form other air chambers. Also the stiles 27 and upper rail 28 combine with the sections 5 and 6 of the frame to form the large air chambers 36. Adjacent one of the longitudinal edges of the web portion 32 of each stile and upper rail another flange 27 extends in the opposite direction from the flanges 33 but in parallel relation thereto and this flange 37 is utilized in securing the pane of glass in the window sash, as clearly illustrated in Figures 2 and 3. The inner flange 39 of the lower rail overlaps the side 22 of the raised portion 20 and said lower rail combines with the sill section to form the air chamber 41 similar to the chambers 36. Disposed on each side of the window and extending partially over the top thereof, are the casings 44, in which the parting strips 45 are disposed for dividing the casings into compartments for receiving the usual counterweights 47 for the sashes. The intermediate portions 9 of the side sections of the frame may be provided, if desired, with rubber bumpers 48 supported by means of plates 49 and against which the lower sash may engage to prevent noise when opening the window. The intermediate portions 9 may be displaced, by removing the screws 11, whereby access may be had to the interior of the casings 44 to repair or replace parts therein. The lower sash 26 is provided with an operating handle 50 to facilitate the raising and lowering of the sash. The outer portions 8 of the side sections may have anchored therein the rings 52 utilized for the purpose of attaching a safety belt thereto when washing the window.

What is claimed is:

1. In a window construction, a window frame having a section thereof including an intermediate portion formed with a parting strip, and a window sash engageable with said parting strip, said portion and sash having cooperating flanges for presenting an air chamber, one of said flanges on said frame combining with said parting strip to form a groove for receiving a flange extending from said sash and one of said flanges on one member contacting with a side of said parting strip and being interposed between the latter and a flange on the other member.

2. In a window construction, a window frame having side and top sections each including outer, intermediate and inner members, said intermediate members being formed with a parting strip and a flange arranged along each side of said parting strip, and window sashes each having flanges combining to form a groove for receiving one of the first named flanges, one of the flanges of each sash contacting a side of said parting strip.

3. In a window construction, a window frame having side and top sections each including outer, intermediate and inner members, said intermediate members being formed with a parting strip, the sides of which are provided with grooves, and opposed faces of said outer and inner members being also provided with grooves, and window sashes including flanges engageable with the sides of said parting strip and said opposed faces and cooperating with said grooves to form air chambers.

4. In a window construction, a window frame having side and top sections each including outer, intermediate and inner members, said intermediate members being formed with a parting strip, the sides of which are provided with grooves, and opposed faces of said outer and inner members being also provided with grooves, and window sashes including flanges engageable with the sides of said parting strip and said opposed faces and cooperating with said grooves to form air chambers, said flanges also cooperating with said sections to form other air chambers.

5. In a window construction, a window frame having side and top sections each including outer, intermediate and inner members, said intermediate members being formed with a parting strip and a flange arranged on each side of said parting strip to provide a groove, and sashes mounted in said frame and including stiles, each stile having a flange engageable in said groove, and other flanges cooperating with the last named flange to provide another groove for receiving the adjacent flange of one of the intermediate members.

6. In a window construction, a window frame including a sill section having an upwardly projecting portion and a flange adjacent one side of said portion to form a groove, and a sash mounted in said frame and having a rail including a flange disposed on each side of said upwardly projecting portion, one of said flanges being engageable with the adjacent side of said portion when the sash is in closing position, and the other flange being provided with a third flange which forms with said flange a groove for receiving the flange on said sill section and which engages in the groove formed in said sill section.

7. In a window construction, a window frame including a sill section having an upwardly projecting portion and a flange adjacent one side of said portion to form a groove, and a sash mounted in said frame and having a rail including a flange disposed on each side of said upwardly projecting portion, one of said flanges being engageable with the adjacent side of said portion when the sash is in closing position, and the other flange being provided with a third flange which forms with said flange a groove for receiving the flange on said sill section and which engages in the groove formed in said sill section, the first two named flanges of said rail combining with said sill section to form an air chamber.

8. A window, comprising a metallic frame, a plurality of sliding sashes carried by said frame, co-acting means carried by the frame and sashes presenting a multi-surface contact adjacent the perimeter of the sashes for each sash including the meeting rails thereof and manually actuated means for causing the multi-surface at the meeting rails to be brought into engagement.

9. A window, comprising a metallic frame, a plurality of metallic sliding sashes carried by said frame, and co-acting means extending from the frame sashes presenting not less than two contact surfaces substantially co-extensive with the perimeter of each sash and co-acting with contact surfaces on the frame and not less than two contact surfaces for the respective meeting rails of the sashes extending the full length thereof and manually actuated means for causing the multi-surface at the meeting rails to be brought into engagement.

10. A window, comprising a metallic frame, a plurality of metallic sliding sashes carried by said frame, and co-acting means extending from the frame sashes presenting a contact surface substantially co-extensive with the perimeter of each sash and co-acting with contact surfaces on the frame and not less than two contact surfaces for the respective meeting rails of the sashes extending the full length thereof and manually actuated means for causing the multi-surface at the meeting rails to be brought into engagement.

JOHN POLACHEK.
JULIUS JEPSEN.
EDMUND PEREMI.